(12) United States Patent
Hosokawa et al.

(10) Patent No.: US 7,341,967 B2
(45) Date of Patent: Mar. 11, 2008

(54) GLASS FOR PRESS MOLDING

(75) Inventors: Takaharu Hosokawa, Osaka (JP); Naoki Kikuchi, Osaka (JP); Tatsuya Suetsugu, Osaka (JP); Kazuhisa Kimura, Osaka (JP); Tadashi Hasegawa, Osaka (JP); Toshihiko Einishi, Osaka (JP); Takashi Tarumi, Osaka (JP); Kohei Kadono, Ikeda (JP)

(73) Assignees: Isuzu Glass Co., Ltd., Osaka-shi (JP); National Institute of Advanced Industrial Science and Technology, Tokyo (JP)

( * ) Notice: Subject to any disclaimer, the term of this patent is extended or adjusted under 35 U.S.C. 154(b) by 157 days.

(21) Appl. No.: 10/571,942

(22) PCT Filed: Sep. 7, 2004

(86) PCT No.: PCT/JP2004/013289

§ 371 (c)(1),
(2), (4) Date: Mar. 13, 2006

(87) PCT Pub. No.: WO2005/028387

PCT Pub. Date: Mar. 31, 2005

(65) Prior Publication Data

US 2007/0037685 A1    Feb. 15, 2007

(30) Foreign Application Priority Data

Sep. 17, 2003  (JP) .............................. 2003-324883

(51) Int. Cl.
*C03C 3/066*  (2006.01)
*C03C 3/093*  (2006.01)

(52) U.S. Cl. .......................................... 501/67; 501/79
(58) Field of Classification Search .................. 501/67, 501/79
See application file for complete search history.

(56) References Cited

U.S. PATENT DOCUMENTS 5,744,409 A * 4/1998 Hashimoto et al. ........... 501/65
7,087,543 B2 * 8/2006 Kasuga et al. ................ 501/79

FOREIGN PATENT DOCUMENTS

| JP | 5-193979 | 8/1993 |
|---|---|---|
| JP | 2003-89543 | 3/2003 |
| JP | 2003-292336 | 10/2003 |

* cited by examiner

*Primary Examiner*—Karl E Group
(74) *Attorney, Agent, or Firm*—Kratz, Quintos & Hanson, LLP

(57) ABSTRACT

The present invention provides a novel glass material that allows the production of a glass product having both excellent chemical durability and high precision by a press molding method. Specifically, the present invention provides a glass for press molding, comprising 38% to 45% by weight of $SiO_2$, 18% to 27% by weight of $B_2O_3$, 16% to 25% by weight of $Al_2O_3$, 2% to 12% by weight of ZnO, no more than 3% by weight of MgO, no more than 3% by weight of CaO, no more than 3% by weight of BaO, 13% to 18% by weight of $Li_2O$, no more than 3% by weight of $K_2O$, and no more than 2% by weight of $Na_2O$; wherein the glass has a deformation temperature of 520° C. or lower; and the glass has a water resistance of grade 2 or higher as measured according to the Japanese Optical Glass Industrial Standard method for measuring the chemical durability of an optical glass.

4 Claims, No Drawings

GLASS FOR PRESS MOLDING

TECHNICAL FIELD

The present invention relates to a glass for press molding.

BACKGROUND ART

Integrated lens arrays or aspherical lenses are used in various projectors as important optical components to condense light from a high-brightness light source or to diffuse such light uniformly. Nowadays, such lenses for optical components are required to have high precision. In particular, microlens arrays utilized for image processing are required to have high optical precision to provide high-definition images.

Precision press-molding, wherein polishing is not necessary, has been widely adopted as a method for producing such optical lenses. In order to produce high-precision lenses by this method, it is necessary to decrease the thermal deformation of molds and to enhance transferability. Therefore, an important technical problem is to lower the deformation temperature of the glass material.

Low-melting point borosilicate crown glasses are known as glass materials having low deformation temperatures. However, since the chemical durability of low-melting point borosilicate glasses tends to decrease with lowering deformation temperature, they are not suitable for practical use in lens arrays or aspherical lenses.

In contrast, conventional glass materials such as Pyrex (registered trademark) and white plate glasses have good chemical durability. However, such glass materials have high deformation temperatures; therefore, when they are used for press molding, mold thermal deformation tends to occur, which makes it difficult to produce high-precision lenses.

Japanese Unexamined Patent Publication No. 1993-19379 discloses, as a glass for press molding, an optical glass for precision press molding comprising $SiO_2$, $B_2O_3$, and $Al_2O_3$ as principal components, and further comprising 3% to 12% by weight of $Li_2O$. Although this glass is described as having a deformation temperature of 560° C. or lower and allowing precision press molding at a temperature of 600° C. or lower, an improvement is desired in terms of press moldability at low temperature. This glass is also unsatisfactory in terms of chemical durability.

Japanese Unexamined Patent Publication No. 2001-89183 discloses an optical glass for press molding comprising, as an essential component, an alkali metal oxide comprising $Li_2O$, $Na_2O$, and $K_2O$. Although this glass has improved press moldability at low temperature, a further improvement is desired in terms of chemical durability.

DISCLOSURE OF THE INVENTION

The present invention has been made in view of the above-mentioned conventional technology. A principal object of the present invention is to provide a novel glass material that allows the production of a glass product having both excellent chemical durability and high precision by a press molding method.

The present inventors conducted extensive research in order to achieve the above object. As a result, the present inventors found that the deformation temperature of a glass material can be lowered by adjusting the composition of the glass material so that it contains a larger amount of $Li_2O$ than known glasses for press molding do; and that a glass having both excellent low-temperature precision press moldability and excellent chemical durability can be obtained by further adjusting the amounts of $SiO_2$, $B_2O_3$, $Al_2O_3$, ZnO, etc. within specific ranges. Based on such findings, the inventors have accomplished the present invention.

The present invention provides the following glasses for press molding.

1. A glass for press molding, comprising 38% to 45% by weight of $SiO_2$, 18% to 27% by weight of $B_2O_3$, 16% to 25% by weight of $Al_2O_3$, 2% to 12% by weight of ZnO, no more than 3% by weight of MgO, no more than 3% by weight of CaO, no more than 3% by weight of BaO, 13% to 18% by weight of $Li_2O$, no more than 3% by weight of $K_2O$, and no more than 2% by weight of $Na_2O$;

wherein the glass has a deformation temperature of 520° C. or lower; and the glass has a water resistance of grade 2 or higher as measured according to the Japanese Optical Glass Industrial Standard method for measuring the chemical durability of an optical glass.

2. A glass for press molding according to item 1, wherein the glass has a thermal expansion coefficient of no more than $97 \times 10^{-7}$/° C.

3. A glass for press molding according to item 1 or 2, wherein the glass is used as a glass for lens arrays or a glass for aspherical lenses.

The glass for press molding of the present invention comprises 38% to 45% by weight of $SiO_2$, 18% to 27% by weight of $B_2O_3$, 16% to 25% by weight of $Al_2O_3$, 2% to 12% by weight of ZnO, no more than 3% by weight of MgO, no more than 3% by weight of CaO, no more than 3% by weight of BaO, 13% to 18% by weight of $Li_2O$, no more than 3% by weight of $K_2O$, and no more than 2% by weight of $Na_2O$.

A glass material within the above composition range is capable of having a low deformation temperature, thus improving low-temperature press moldability, while also maintaining sufficient chemical durability.

In the glass of the present invention, $SiO_2$ is a principal component for forming the glass network structure. The proportion of $SiO_2$ in the entire glass must be in the range of about 38% to about 45% by weight, and is preferably in the range of about 39% to about 42% by weight. Too small an amount of $SiO_2$ is undesirable in that the chemical durability of the glass is thereby impaired; and, on the other hand, too large an amount of $SiO_2$ is undesirable in that the deformation temperature of the glass is raised, with the result that the low-temperature press moldability of the glass is thereby impaired.

In the glass of the present invention, $B_2O_3$, like $SiO_2$, is a principal component for forming the glass network structure. The proportion of $B_2O_3$ in the entire glass must be in the range of about 18% to about 27% by weight, and is preferably in the range of about 20% to about 25% by weight. If the amount of $B_2O_3$ is decreased, the deformation temperature of the glass tends to increase; and an amount of $B_2O_3$ below the specified range is undesirable in that the low-temperature press moldability of the glass is thereby impaired. An amount of $B_2O_3$ above the specified range is undesirable in that the chemical durability of the glass is thereby impaired.

In the glass of the present invention, the amounts of $SiO_2$ and $B_2O_3$ are each adjusted to within the above-specified ranges, thus imparting sufficient chemical durability to the glass while sufficiently lowering the deformation temperature of the glass, and further making vitrification easy.

The proportion of $Al_2O_3$ in the entire glass is in the range of about 16% to about 25% by weight, and preferably in the range of about 16% to about 20% by weight. When the amount of $Al_2O_3$ is within the specified range, the glass has excellent chemical durability despite having a relatively high $Li_2O$ content. An amount of $Al_2O_3$ below the specified range is undesirable in that the chemical durability of the glass tends to be thereby impaired; and, on the other hand, an amount of $Al_2O_3$ above the specified range is undesirable in that vitrification is thereby difficult.

The proportion of ZnO in the entire glass must be in the range of about 2% to about 12% by weight, and is preferably in the range of about 2% to about 6% by weight. When the amount of ZnO is within the above range, the glass is capable of having sufficient chemical durability while having a sufficiently low deformation temperature. An amount of ZnO below the specified range is undesirable in that the chemical durability of the glass is thereby impaired; and, on the other hand, an amount of ZnO above the specified range is undesirable in that the deformation temperature of the glass cannot be sufficiently lowered.

MgO, CaO, and BaO are components that are effective for enhancing chemical durability; however, if they are used in large amounts, the deformation temperature of the glass tends to be raised. Therefore, the proportions of MgO, CaO, and BaO in the entire glass must be each no more than about 3% by weight, and are each preferably no more than about 1% by weight. In order to sufficiently achieve the desired effects, the lower limits to the amounts of MgO, CaO, and BaO are each preferably about 0.1% by weight.

$Li_2O$ is a component that is effective for lowering the deformation temperature of the glass; however, if it is used in a large amount, the chemical durability of the glass tends to be impaired. Although the glass of the present invention contains at least 13% by weight of $Li_2O$, i.e., a larger amount of $Li_2O$ than conventional glasses for press molding contain, it is capable of maintaining excellent chemical durability by adjusting the components of the glass within the above specified ranges. The proportion of $Li_2O$ in the glass of the invention must be in the range of about 13% to about 18% by weight, and is preferably in the range of about 13% to about 15% by weight. An amount of $Li_2O$ below 13% by weight is undesirable in that the deformation temperature of the glass cannot be sufficiently lowered. An amount of $Li_2O$ above the specified range is undesirable in that the chemical durability of the glass is thereby impaired and that vitrification is unstable, readily causing devitrification.

$K_2O$ and $Na_2O$ are effective for lowering the deformation temperature of the glass; however, if they are used in large amounts, the chemical durability of the glass is thereby impaired. Therefore, the proportion of $K_2O$ in the entire glass is no more than about 3% by weight; and the proportion of $Na_2O$ in the entire glass is no more than about 2% by weight. In order to sufficiently achieve the desired effects, the lower limit to the amount of $K_2O$ is preferably about 0.3% by weight; and the lower limit to the amount of $Na_2O$ is preferably about 0.3% by weight.

The present invention provides a glass for press molding having both a very low deformation temperature and excellent chemical durability by adjusting the components of the glass within the above specific ranges, wherein the glass has a deformation temperature of 520° C. or lower; and the glass has a water resistance of grade 2 or higher as measured according to the Japanese Optical Glass Industrial Standard (JOGIS 06) method (powder method) for measuring the chemical durability of an optical glass.

Since such a glass has a low deformation temperature, it allows precision press molding at low temperature; and such a glass also has sufficient chemical durability for use in optical components.

Therefore, the glass of the present invention can be effectively used as a glass for optical components such as integrated lens arrays, aspherical lenses, etc.

Furthermore, the glass for press molding of the present invention preferably has a thermal expansion coefficient of no more than about $97 \times 10^{-7}$/° C. Such a low thermal expansion coefficient prevents breakage of the glass over long periods, even when the glass is exposed to light from a high-brightness light source. A glass having a thermal expansion coefficient of no more than about $97 \times 10^{-7}$/° C. can be obtained by adjusting the components of the glass within the above-specified ranges. Specifically, glasses containing $SiO_2$, $B_2O_3$, $Al_2O_3$, ZnO, etc. in large amounts tend to have low thermal expansion coefficients. Glasses containing MgO, CaO, BaO, $Li_2O$, etc. in large amounts tend to have high thermal expansion coefficients. Based on such tendencies, within the above-specified ranges, the amounts of the components of the glass of the invention may be suitably determined so as to obtain the intended thermal expansion coefficient.

In order to improve chemical durability, meltability, etc., the glass of the present invention may further contain $P_2O_5$, $TiO_2$, $ZrO_2$, SnO, SrO, $WO_3$, $La_2O_3$, etc., as necessary. The glass of the present invention may also contain $Sb_2O_3$, F, Cl, etc. as clarifying agents. The amounts of such components may be suitably determined within a range that meets the requirements of the glass for press molding of the present invention.

The glass of the present invention can be produced by mixing starting materials together in specific proportions and melting them at about 1150° C. to about 1350° C. with stirring, followed by performing clarification and molding. Examples of the starting materials include conventional materials for glasses, such as oxides, carbonates, hydroxides, sulfates, nitrates, etc., from which specific components can be formed, and such materials for glasses may be used as they are.

The glass for press molding of the present invention, which has a low deformation t rature (a deformation temperature of 520° C. or lower), allows precision press molding at relatively low temperature. Therefore, when press molding is carried out using the glass of the present invention, damage to the mold can be lessened, and the life of the mold can thus be prolonged.

Furthermore, the glass of the present invention has sufficient chemical durability as required for optical glasses.

When the glass of the present invention has a thermal expansion coefficient of no more than about $97 \times 10^{-7}$/° C., it is capable of remaining unbroken and being stably used for long periods even when exposed to light from a high-brightness light source.

Since the glass of the present invention has such excellent features, it is highly useful as a material for integrated lens arrays, aspherical lenses, etc. produced by precision press molding.

BEST MODE FOR CARRYING OUT THE INVENTION

The present invention is hereinafter described in further detail with reference to examples.

Example 1

After weighing out starting materials in accordance with the proportions shown in Table 1 and mixing them, the mixture was placed in a platinum crucible, melted at 1150° C. to 1250° C. in an electric furnace with stirring, cast into a preheated mold, and slowly cooled, thus giving a sample of glass. The starting materials used were oxides, hydroxides, carbonates, nitrates, etc. corresponding to the components of the glass of each example.

The measurement results of deformation temperatures, thermal expansion coefficients, and chemical durabilities of the obtained glass samples are shown in Table 1 below. The deformation temperatures are the measured values obtained using a thermal dilatometer when the temperature was raised at 5° C./minute. Chemical durability is expressed by a water resistance value measured according to the method (powder method) for measuring the chemical durability of an optical glass as defined in the Japanese Optical Glass Industrial Standards (JOGIS 06-$^{1975}$). A water resistance of grade 2 or higher. means that the quantitative loss is less than 0.10% by weight.

TABLE 1

|  | Example |  |  |  |  | Comp. Ex. | |
|---|---|---|---|---|---|---|---|
|  | 1 | 2 | 3 | 4 | 5 | 1 | 2 |
| Components (% by weight) | | | | | | | |
| $SiO_2$ | 38 | 42 | 38 | 40 | 39 | 69 | 39 |
| $Al_2O_3$ | 22 | 19 | 17 | 16 | 16 | | 8 |
| $B_2O_3$ | 18 | 19 | 20 | 22 | 24 | | 22 |
| $Na_2O$ | 1 | 2 | 0 | 0 | 1 | 8.5 | 22 |
| $K_2O$ | | 0.5 | | | | 8.5 | |
| $Li_2O$ | 15 | 13 | 16 | 13 | 15.5 | | 0 |
| MgO | | 1 | | 1.9 | 0.5 | | |
| CaO | | 0.7 | | 2.6 | | 6.9 | |
| BaO | | 0.3 | | | | 2.1 | |
| ZnO | 6 | 2.5 | 9 | 4.5 | 4 | 5.0 | 11 |
| Vitrification | Good | Good | Good | Good | Good | Good | Good |
| Water resistance (grade) | 2 | 1 | 2 | 1 | 2 | 2 | 3 |
| Deformation temperature (° C.) | 495 | 498 | 474 | 515 | 487 | 675 | 518 |

TABLE 1-continued

|  | Example |  |  |  |  | Comp. Ex. | |
|---|---|---|---|---|---|---|---|
|  | 1 | 2 | 3 | 4 | 5 | 1 | 2 |
| Thermal expansion Coefficient ($\times 10^{-7}$/° C.) | 96 | 94 | 96 | 93 | 92 | 95 | 92 |

Subsequently, blocks of glass were produced from each of the glass samples of Examples 1 to 4 and subjected to press molding, with the result that they had excellent press moldability.

Furthermore, lens arrays 50 mm long, 50 mm wide, and 3 mm thick were produced from each of the glass samples of Examples 1 to 4. The lens arrays were placed at a distance of 50 mm from a 200 W ultrahigh pressure mercury lamp. Irradiation was performed for 5000 hours, with the result that the lens arrays had no abnormalities such as cracks.

The invention claimed is:

1. A glass for press molding, comprising 38% to 45% by weight of $SiO_2$, 18% to 27% by weight of $B_2O_3$, 16% to 25% by weight $Al_2O_3$, 2% to 12% by weight of ZnO, no more than 3% by weight of MgO, no more than 3% by weight of CaO, no more than 3% by weight of BaO, 13% to 18% by weight of $Li_2O$, no more than 3% by weight of $K_2O$, and no more than 2% by weight of $Na_2O$;

wherein the glass has a deformation temperature of 520° C. or lower; and the glass has a water resistance of grade 2 or higher as measured according to the Japanese Optical Glass Industrial Standard method for measuring the chemical durability of an optical glass.

2. A glass for press molding according to claim 1, wherein the glass has a thermal expansion coefficient of no more than $97 \times 10^{-7}$/° C.

3. A glass for press molding according to claim 1, wherein the glass is used as a glass for lens arrays or a glass for aspherical lenses.

4. A glass for press molding according to claim 2, wherein the glass is used as a glass for lens arrays or a glass for aspherical lenses.

* * * * *